United States Patent
Arai (10) Patent No.: US 9,878,708 B2
(45) Date of Patent: Jan. 30, 2018

(54) CONTROL APPARATUS FOR VEHICLE, AND VEHICLE

(71) Applicant: TOYOTA JIDOSHA KABUSHIKI KAISHA, Toyota-shi, Aichi-ken (JP)

(72) Inventor: Yasuo Arai, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 15/017,761

(22) Filed: Feb. 8, 2016

(65) Prior Publication Data
US 2016/0236676 A1    Aug. 18, 2016

(30) Foreign Application Priority Data
Feb. 18, 2015   (JP) .................. 2015-029520

(51) Int. Cl.
*G05D 1/00*      (2006.01)
*B60W 20/40*     (2016.01)
*F16D 48/06*     (2006.01)

(52) U.S. Cl.
CPC .......... *B60W 20/40* (2013.01); *F16D 48/066* (2013.01); *B60W 2520/10* (2013.01); *B60W 2550/147* (2013.01); *B60W 2710/021* (2013.01); *F16D 2500/1026* (2013.01); *F16D 2500/10412* (2013.01); *F16D 2500/30806* (2013.01); *F16D 2500/3101* (2013.01); *F16D 2500/3108* (2013.01); *F16D 2500/3124* (2013.01); *F16D 2500/3125* (2013.01); *F16D 2500/3127* (2013.01); *F16D 2500/31426* (2013.01); *F16D 2500/31433* (2013.01); *F16D 2500/7041* (2013.01); *Y10S 903/946* (2013.01)

(58) Field of Classification Search
CPC ............................ B60W 20/40; F16D 48/066
See application file for complete search history.

(56) References Cited

U.S. PATENT DOCUMENTS

2005/0182533 A1*   8/2005  Tobler .................... B60K 6/48
                                                                701/22

FOREIGN PATENT DOCUMENTS

| JP | 2008-298145 A | 12/2008 |
|----|---------------|---------|
| JP | 2009-210000 A | 9/2009  |
| JP | 2014-184923 A | 10/2014 |

* cited by examiner

*Primary Examiner* — Adam D Tissot
(74) *Attorney, Agent, or Firm* — Oliff PLC (57) ABSTRACT

A drive system includes a drive source and a transmission mechanism transmitting a torque between the drive source and a drive wheel. The transmission mechanism includes at least one clutch switching between an engaged state of transmitting the torque between elements constituting the drive system and a disengaged state of failing to transmit the torque. An ECU detects at least one loaded state in which an excessively large torque can be applied to the drive system in a direction from the drive wheel, and disengages a predetermined clutch when the at least one loaded state in which an excessively large torque can be applied is detected. In the case where an excessively large torque can be applied to the drive system, the torque applied to a predetermined element constituting the drive system can be blocked and the torque applied to the drive system can be suppressed with a good response.

4 Claims, 4 Drawing Sheets

| ACCELERATOR PEDAL POSITION | 0 % | | | | | | | |
|---|---|---|---|---|---|---|---|---|
| VEHICLE SPEED | V1 km／h 以上 | | | | | | | |
| SHIFT POSITION OF SUB TRANSMISSION | HIGH | | | | LOW | | | |
| ROAD SURFACE | NON-WAVY ROAD | | WAVY ROAD | | NON-WAVY ROAD | | WAVY ROAD | |
| BRAKE | NORMAL | SUDDEN | NORMAL | SUDDEN | NORMAL | SUDDEN | NORMAL | SUDDEN |
| K0 CLUTCH | ○ | ○ | ○ | ○ | × | × | × | × |
| K2 CLUTCH | ○ | ○ | ○ | ○ | ○ | × | ○ | × |
| LUC | ○ | ○ | ○ | ○ | ○ | ○ | × | × |

※ ○：NORMAL CONTROL　×：DISENGAGE CLUTCH

FIG.4

CONTROL APPARATUS FOR VEHICLE, AND VEHICLE

This nonprovisional application is based on Japanese Patent Application No. 2015-029520 filed on Feb. 18, 2015 with the Japan Patent Office, the entire contents of which are hereby incorporated by reference.

BACKGROUND OF THE INVENTION

Field of the Invention

The present invention relates to a control apparatus for a vehicle including a drive system, and to a vehicle.

Description of the Background Art

Generally, when a vehicle is braked while traveling, reduction of the speed of a rotational inertia body of a drive system causes a torsional torque T to be applied to the drive system. Particularly in the case where the vehicle includes a sub transmission in addition to a main transmission such as automatic transmission and the transmission is in a low gear as well as where the vehicle has a hybrid system including, in addition to an engine, a motor generator (hereinafter referred to as MG) having a large moment of inertia, torsional torque T applied to the drive system is excessively large. Thus, in order to ensure an adequate parts strength for addressing such an excessively large torsional torque, it is necessary to increase the parts size. An example of the hybrid system is a single-MG hybrid system including only one MG (see for example Japanese Patent Laying-Open No. 2014-184923).

Torsional torque T applied to the drive system is conceptually represented by $T=I_{eq} \times (\omega 1 - \omega 0/\Delta t$ ($I_{eq}$: equivalent moment of inertia, $\omega$: angular velocity of rotational body, $\Delta t$: unit time). The equivalent moment of inertia from the engine to the transmission is represented by $I_{eq}=I_e \times \lambda \times \lambda$ ($I_e$: moment of inertia from the engine to the transmission input, $\lambda$: total gear ratio of the transmission). It is seen from this equation as well that in the case of the hybrid system and in the case where the sub transmission is in the low gear for example, the equivalent moment of inertia is large and therefore torsional torque T applied to the drive system when the vehicle is braked is large.

In order to address such a problem, some conventional four-wheel drive vehicles shift the transmission to a higher gear when it is determined that drive wheels spin. In this way, the torque applied from the drive wheels to a powertrain (transmission, torque converter, and clutch for example) when the vehicle is braked suddenly can be suppressed (see for example Japanese Patent Laying-Open No. 2009-210000). Here, the powertrain is a transmission mechanism transmitting a torque between a drive source (engine, MG, and the like for example) and drive wheels. The drive system includes the drive source and the powertrain.

SUMMARY OF THE INVENTION

Under transmission control for an automatic transmission, clutch engagement is changed, for example. Due to this, it takes some time to complete the transmission control, according to the technique disclosed in Japanese Patent Laying-Open No. 2009-210000, which results in a problem concerning the response when the torque applied to the drive system is suppressed. Moreover, the torque applied to a certain element (engine for example) which is a constituent element of the drive system cannot completely be blocked.

The present invention has been made to solve the above-described problems, and an object of the present invention is to provide a control apparatus for a vehicle as well as a vehicle that can block the torque applied to a predetermined element constituting the drive system, and can suppress, with a good response, the torque applied to the drive system, when an excessively large torque can be applied to the drive system.

A control apparatus for a vehicle according to the present invention is a control apparatus for a vehicle including a drive system. The drive system includes a drive source and a transmission mechanism transmitting a torque between the drive source and a drive wheel. The transmission mechanism includes at least one clutch switching between an engaged state of transmitting the torque between elements constituting the drive system and a disengaged state of failing to transmit the torque.

The control apparatus includes a control unit and a detection unit. The detection unit is configured to detect at least one loaded state in which an excessively large torque can be applied to the drive system in a direction from the drive wheel. The control unit is configured to switch at least one of the at least one clutch to the disengaged state when the detection unit detects the at least one loaded state in which an excessively large torque can be applied.

In accordance with the present invention, when at least one loaded state in which an excessively large torque can be applied to the drive system in a direction from the drive wheel is detected, the at least one clutch is switched to the disengaged state to thereby prevent the torque from being transmitted to a predetermined element. Because a predetermined element is disconnected from the drive system, there is no moment of inertia of the predetermined element and thus the torque applied to the drive system can be suppressed. In this case, it is only necessary to switch the at least one clutch to the disengaged state, the response can be enhanced.

As a result of this, in the case where an excessively large torque can be applied to the drive system in the vehicle, the torque applied to a predetermined element constituting the drive system can be blocked and the torque applied to the drive system can be suppressed with a good response.

Preferably, the at least one clutch is a plurality of clutches. The at least one loaded state is a plurality of loaded states. The control unit switches at least two of the plurality of clutches in a stepwise manner, depending on which of the plurality of loaded states is detected.

In accordance with the present invention, in the case where an excessively large torque can be applied to the drive system, the torque applied to at least two of a plurality of predetermined elements can be blocked in a stepwise manner depending on which of a plurality of loaded states is detected, and the torque applied to the drive system can be suppressed in a stepwise manner.

As a result of this, less clutches are switched to the disengaged state when the load is lower, and thus the response with which the torque is blocked can be enhanced. In contrast, a higher load causes more clutches to be switched to the disengaged state, thus more predetermined elements are disconnected from the drive system and the torque applied to the drive system can be suppressed to a greater extent.

More preferably, the drive source includes an engine. The transmission mechanism includes a torque converter provided on an output side of the engine, a main transmission provided on an output side of the torque converter, and a sub transmission provided on an output side of the main transmission and configured to further decelerate an output from the main transmission. The plurality of clutches include a lock-up clutch included in the torque converter, and a first clutch provided between the engine and the torque converter.

The detection unit detects, as the at least one loaded state, a state in which the vehicle is braked, a state in which the sub transmission decelerates the output from the main transmission, and a state in which the vehicle is traveling on a bad road. The control unit switches the first clutch to the disengaged state when the detection unit detects the state in which the vehicle is braked, the state in which the sub transmission decelerates the output from the main transmission, and a state in which the vehicle is not traveling on a bad road.

The control unit switches the first clutch and the lock-up clutch to the disengaged state when the detection unit detects the state in which the vehicle is braked, the state in which the sub transmission decelerates the output from the main transmission, and the state in which the vehicle is traveling on a bad road.

In accordance with the present invention, when the state in which the vehicle is braked, the state in which the sub transmission decelerates the output from the main transmission, and the state in which the vehicle is not traveling on a bad road are detected, transmission of the torque to the engine can be blocked. When the state in which the vehicle is braked, the state in which the sub transmission decelerates the output from the main transmission, and the state in which the vehicle is traveling on a bad road are detected, the torque transmitted by the lock-up clutch can additionally be blocked. Thus, in the case where an excessively large torque can be applied to the drive system, the torque applied to the engine or to an element located between the engine and the lock-up clutch can be blocked in a stepwise manner. Since the elements are disconnected in a stepwise manner, the torque applied to the drive system can be suppressed in a stepwise manner.

As a result of this, in the case where only the first clutch is switched to the disengaged state, the response with which the torque to the engine is blocked can be enhanced to a greater extent. Moreover, in the case where the lock-up clutch is switched to the disengaged state in addition to the first clutch, the torque applied to the engine and to an element located between the lock-up clutch and the engine can be suppressed to a greater extent.

More preferably, the drive source further includes a motor generator provided between the engine and the torque converter. The plurality of clutches include a second clutch provided between the motor generator and a shaft connecting the engine and the torque converter to each other.

The detection unit detects, as the at least one loaded state, a state in which a strength of braking is a predetermined amount or more. The control unit additionally switches the second clutch to the disengaged state when the detection unit detects the state in which the strength of braking is a predetermined amount or more.

In accordance with the present invention, in the case of the loaded state in which the strength of breaking is a predetermined amount or more, transmission of the torque to the motor generator can further be blocked. Thus, in the case where an excessively large torque can be applied to the drive system, the torque applied to the motor generator can be blocked. Accordingly, the torque applied to the drive system can further be suppressed.

A vehicle according to another aspect of the present invention includes the above-described control apparatus. In accordance with the present invention, in the case where an excessively large torque can be applied to the drive system in the vehicle, the torque applied to a predetermined element constituting the drive system can be blocked, and the torque applied to the drive system can be suppressed with a good response.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will hereinafter be described in detail with reference to the drawings. In the drawings, the same or corresponding parts are denoted by the same reference characters, and a description thereof will not be repeated.

Figure 1:
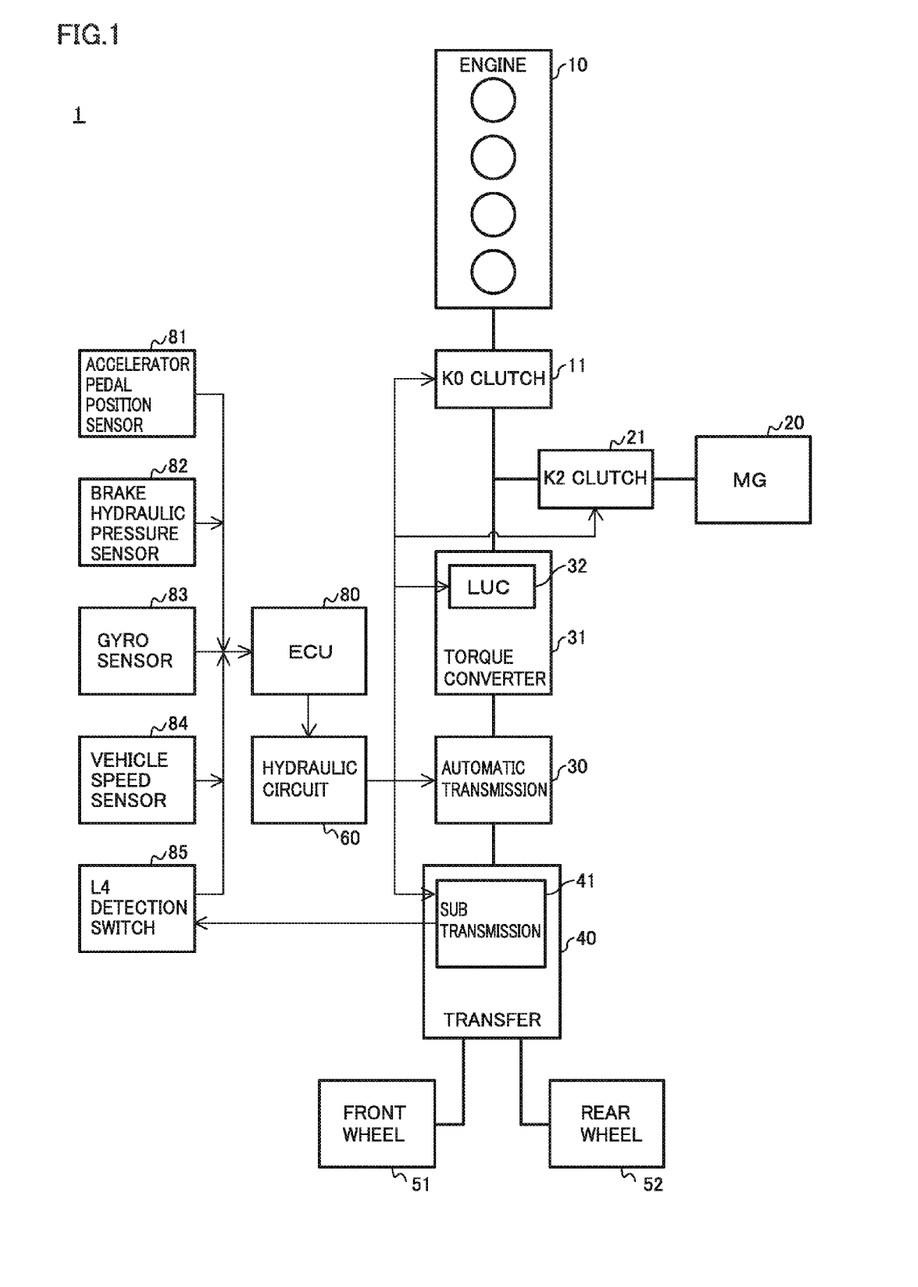
FIG. 1 is a block diagram schematically showing a configuration of a vehicle to which applied an ECU which is a control apparatus according to an embodiment of the present invention.

FIG. 1 is a block diagram schematically showing a configuration of a vehicle 1 to which applied an ECU (Electronic Control Unit) 80 which is a control apparatus according to an embodiment of the present invention.

Referring to FIG. 1, vehicle 1 in the present embodiment is a so-called hybrid vehicle which includes an engine 10 and an MG 20 as drive sources. Vehicle 1 includes engine 10, MG 20, a torque converter 31, an automatic transmission 30, a transfer 40, two front wheels 51, two rear wheels 52, a hydraulic circuit 60, and an ECU 80. Vehicle 1 is a so-called four-wheel drive vehicle whose two front wheels 51 and two rear wheels 52 are drive wheels.

Engine 10 is an internal combustion engine such as gasoline engine or diesel engine, for example. Engine 10 generates a drive force for driving vehicle 1. An output shaft of engine 10 is connected via a K0 clutch 11 to torque converter 31. When engaged by a hydraulic pressure from hydraulic circuit 60, K0 clutch 11 becomes able to transmit torque. When disengaged, K0 clutch 11 becomes unable to transmit torque.

MG 20 is an AC rotating electric machine, such as for example a three-phase AC synchronous electric generator. MG 20 has a function of a motor generating a drive force for driving vehicle 1, a function of generating electric power from a torque applied from engine 10 and a torque applied in the direction from the wheels, and a function of a starter stating engine 10 with the generated drive force. MG 20 is connected via a K2 clutch 21 between K0 clutch 11 and torque converter 31. When engaged by a hydraulic pressure from hydraulic circuit 60, K2 clutch 21 becomes able to transmit the torque. When disengaged, K2 clutch 21 becomes unable to transmit the torque.

Torque converter 31 uses the action of a fluid to transmit the torque between an input shaft and an output shaft. Further, torque converter 31 includes a lock-up clutch (hereinafter "LUC" and also "LU clutch") 32. When LUC 32 is engaged by the hydraulic pressure from hydraulic circuit 60, respective rotations of the input shaft and the output shaft of torque converter 31 are synchronized with each other. Disengagement of LUC 32 causes the rotations to become out of synchronization with each other, namely causes a state where the action of the fluid causes torque to be transmitted.

Automatic transmission 30 is a gear-type automatic transmission having a plurality of gear ratios which are automatically changed. Automatic transmission 30 includes gears for forming a plurality of gear ratios by the hydraulic pressure from hydraulic circuit 60, a brake, and a clutch. Automatic transmission 30 is connected to the output shaft of torque converter 31. Automatic transmission 30 may be any of other types of automatic transmissions such as continuously variable transmission. Instead of automatic transmission 30, a manual transmission may be used.

Transfer 40 has its input shaft connected to an output shaft of automatic transmission 30 and has its output shaft connected to two front wheels 51 and two rear wheels 52. Transfer 40 transmits the torque between automatic transmission 30 and front wheels 51 and rear wheels 52. Transfer 40 includes a sub transmission 41. Sub transmission 41 changes the rotational speed which is input from automatic transmission 30 by means of a plurality of gear ratios. In the present embodiment, sub transmission 41 has two gear ratios, namely high and low gears. When sub transmission 41 is in the high gear, sub transmission 41 transmits the rotational speed of the input shaft directly to the output shaft without changing the speed. When sub transmission 41 is in the low gear, sub transmission 41 reduces the rotational speed of the input shaft and transmits it to the output shaft. Accordingly, in the case of the low gear, a stronger torque is transmitted to front wheels 51 and rear wheels 52, as compared with the case of the high gear. Thus, in vehicle 1, the transmission of motive power to the four wheels, namely front wheels 51 and rear wheels 52 and the increase of the torque transmitted by the sub transmission to the drive wheels improve the traveling performance on a bad road.

Hydraulic circuit 60 includes an oil pump and a plurality of adjustment valves. Based on a control signal from ECU 80, hydraulic circuit 60 uses the adjustment valves to adjust the hydraulic pressure of an operating fluid supplied from the oil pump and then supplies the adjusted hydraulic pressure to K0 clutch 11, K2 clutch 21, LUC 32, automatic transmission 30, and transfer 40, for example.

In K0 clutch 11, K2 clutch 21, LUC 32, and the brake and the clutch in automatic transmission 30, a clutch piston is moved by the hydraulic pressure of the operating fluid supplied from hydraulic circuit 60. The clutch piston causes two rotational bodies (a drive plate and a driven plate each provided with a friction material) for exchanging the motive power in each clutch to be pressed. Then, friction is generated between the two rotational bodies and the force acts so that the rotational bodies do not rotate relative to each other. Accordingly, the rotational bodies are engaged (namely respective rotations of the two rotational bodies become in synchronization with each other). K0 clutch 11 is for example a multiplate wet friction clutch. K2 clutch 21 is for example a dog clutch. LUC 32 is for example a wet friction clutch.

ECU 80 controls hydraulic circuit 60 so that K0 clutch 11, K2 clutch 21, LUC 32, and the brake and the clutch in automatic transmission 30 are engaged or disengaged, depending on the operating condition of vehicle 1.

Vehicle 1 includes sensors, namely an accelerator pedal position sensor 81 for detecting the degree to which the accelerator pedal is operated by a user, a brake hydraulic pressure sensor 82 for detecting the hydraulic pressure applied to the brake, a gyro sensor 83 for detecting a movement of vehicle 1, a vehicle speed sensor 84 for detecting the vehicle speed of vehicle 1, and an L4 detection switch 85 for detecting the state in which sub transmission 41 is in the low gear. These sensors transmit respective results of the detection to ECU 80.

ECU 80 is configured to include a CPU (Central Processing Unit) and a memory which are not shown here. ECU 80 is activated when a user performs an operation for starting vehicle 1 (an operation of causing an ignition switch (hereinafter also referred to as "IG") which is not shown, to switch from the OFF state to the ON state, which is hereinafter also referred to as "IG ON operation"). When activated by the IG ON operation, ECU 80 performs a predetermined arithmetic process based on information from each sensor and information stored in the memory, and then controls each device in vehicle 1 based on the results of the arithmetic operation.

ECU 80 causes vehicle 1 to travel in any of a motor travel mode, a hybrid travel mode, and an engine travel mode. In the case where the SOC (State Of Charge) of a battery is sufficiently high, the motor travel mode is performed for causing the vehicle to travel forward at a low speed (less than 30 km/h for example), while the hybrid travel mode or the engine travel mode is performed for causing the vehicle to travel forward at a high speed (30 km/h or more for example).

In the motor travel mode, ECU 80 engages K2 clutch 21 (connects MG 20 to the input shaft of automatic transmission 30) and disengages K0 clutch 11 (disconnects engine 10 from the input shaft of automatic transmission 30), to thereby allow the motive power of MG 20 to rotate the input shaft of automatic transmission 30.

In the hybrid travel mode, ECU 80 engages K2 clutch 21 (connects MG 20 to the input shaft of automatic transmission 30) and engages K0 clutch 11 (connects engine 10 to the input shaft of automatic transmission 30) to thereby allow the motive power of at least one of engine 10 and MG 20 to rotate the input shaft of automatic transmission 30.

In the engine travel mode, ECU 80 disengages K2 clutch 21 (disconnects MG 20 from the input shaft of automatic transmission 30) and engages K0 clutch 11 (connects engine 10 to the input shaft of automatic transmission 30) to thereby allow the motive power of engine 10 to rotate the input shaft of automatic transmission 30.

[Protection Control in the Case where Excessively Large Torque is Applied to Drive System]

When vehicle 1 is braked, a torsional torque is applied to the drive system including the drive sources and the powertrain. In the case of a hybrid system including MG 20 in addition to engine 10 as drive sources as in the present embodiment and the vehicle further includes sub transmission 41 capable of further reducing the speed to be transmitted to the drive wheels (front wheels 51, rear wheels 52), the applied torsional torque is further excessively large.

In order to endure such an excessively large torsional torque, each element may be increased in size for the sake of increasing the strength of the drive system such as engine 10, MG 20, torque converter 31, automatic transmission 30, transfer 40, and shafts connecting these elements to each other. However, the increase of the size of each element could deteriorate the fuel economy due to the added weight of vehicle 1 or increase the manufacture cost.

Then, in the present embodiment, ECU 80 provides protection control of the drive system in the case of the loaded state(s) where an excessively large torque can be applied to the drive system in the direction from the drive wheels. Specifically, clutches such as K0 clutch 11, K2 clutch 21, and LUC 32 are switched to the disengaged state where the clutches do not transmit the torque.

Thus, in the case of the loaded state(s) in which an excessively large torque can be applied, the clutches are switched to the disengaged state so that the torque is not transmitted to a predetermined element. Because the predetermined element is disconnected from the drive system, there is no moment of inertia of the predetermined element and accordingly the torque applied to the drive system can be suppressed. In this case, it is only necessary to switch the clutches to the disengaged state, and the response can therefore be enhanced.

Figure 2:
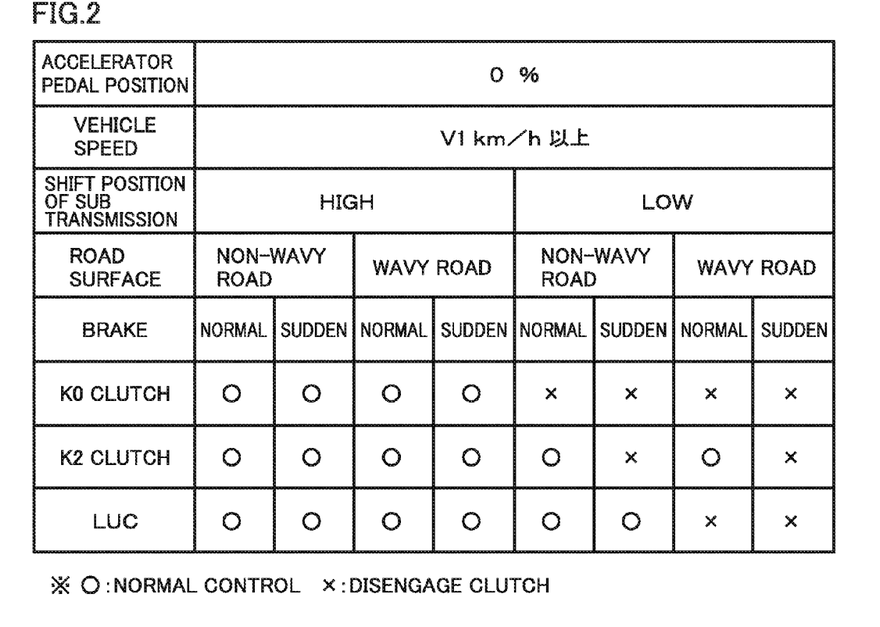
FIG. 2 is a diagram showing a relation between a travel state of a vehicle and an engagement state of each clutch in the present embodiment.
Figure 3:
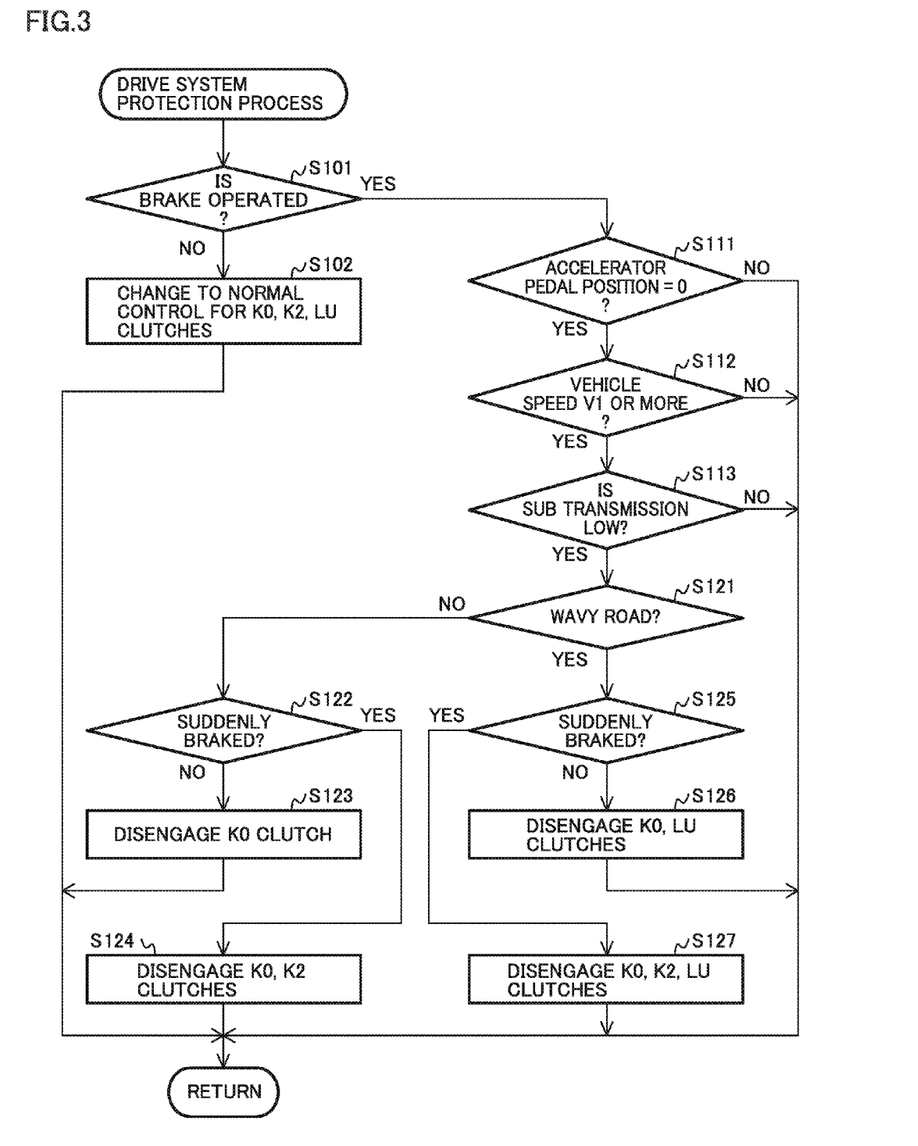
FIG. 3 is a flowchart showing a flow of a drive system protection process performed by the ECU in the present embodiment.

In order to implement such protection control, specifically the following process is performed. FIG. 2 is a diagram showing a relation between a travel state of a vehicle and an engagement state of each clutch in the present embodiment. FIG. 3 is a flowchart showing a flow of the drive system protection process performed by ECU 80 in the present embodiment.

Referring to FIGS. 2 and 3, the drive system protection process shown in FIG. 3 is called from a main process for controlling vehicle 1 and repeatedly performed in very short cycles. First, ECU 80 determines whether or not a hydraulic pressure indicated by a signal from brake hydraulic pressure sensor 82 is a predetermined pressure or more, to thereby determine whether or not the brake is operated (step S101). This step corresponds to detection, by ECU 80, of a state where vehicle 1 is braked or vehicle 1 is not braked.

When ECU 80 determines that the brake is not operated (NO in step S101), ECU 80 changes the control mode for K0 clutch 11, K2 clutch 21, and LUC 32 to a normal control mode (step S102). The normal control mode is a control mode which is normally performed when the protection control for the drive system is not performed, and each clutch is controlled as appropriate for any of the motor travel mode, the hybrid travel mode, and the engine travel mode which is selected depending on the operating condition.

When ECU 80 determines that the brake is operated (YES in step S101), ECU 80 determines whether or not the accelerator pedal position indicated by a signal from accelerator pedal position sensor 81 is 0% (step S111). This step corresponds to detection, by ECU 80, of a state where vehicle 1 is not accelerated or a state where vehicle 1 is accelerated.

When ECU 80 determines that the accelerator pedal position is 0% (YES in step S111), ECU 80 determines whether or not the vehicle speed indicated by a signal from vehicle speed sensor 84 is V1 (km/h) or more (step S112). This step corresponds to detection, by ECU 80, of a state where the vehicle speed of vehicle 1 is a predetermined speed or more or a state where the vehicle speed is less than the predetermined speed.

When ECU 80 determines that the vehicle speed is V1 or more (YES in step S112), ECU 80 determines whether or not sub transmission 41 is in the low gear, based on a signal from L4 detection switch 85 (step S113). This step corresponds to detection, by ECU 80, of a state where sub transmission 41 decelerates the output from automatic transmission 30 or a state where it does not decelerate the output.

When ECU 80 determines that the accelerator pedal position is not 0% (NO in step S111), the vehicle speed is less than V1 (NO in step S112), or sub transmission 41 is not in the low gear (NO in step S113), ECU 80 causes the process to be performed to return to the main process.

When ECU 80 determines that sub transmission 41 is in the low gear (YES in step S113), ECU 80 determines whether or not an indicator which indicates whether the road is a bad road or not is a predetermined value or more, to thereby determine whether or not the surface of the road on which vehicle 1 is traveling is a bad road such as a wavy road (step S121). This step corresponds to detection, by ECU 80, of a state where vehicle 1 is traveling on a bad road or a state where vehicle 1 is not traveling on a bad road. The wavy road is a surface of a road such as a test course formed so that the surface has waves at predetermined pitches and with a predetermined amplitude. The indicator indicating whether or not the road is a bad road is represented by a movement of vehicle 1 which is calculated from respective angular velocities about three axis, namely an axis in the fore-and-aft direction, a lateral axis, and an axis in the up-and-down direction of vehicle 1 that are indicated by gyro sensor 83. Namely, when the indicator indicating a bad road is a predetermined value or more, it is determined that a change of the movement of vehicle 1 is relatively large and thus determined that the road is a bad road.

When ECU 80 determines that the road is not a bad road (NO in step S121), ECU 80 determines whether or not an increase of the hydraulic pressure is P1 (MPa/sec) or more, based on a signal from brake hydraulic pressure sensor 82 and thereby determines whether or not the vehicle is braked suddenly (step S122). This step corresponds to detection, by ECU 80, of a state where the strength of braking is a predetermined amount or more or a state where the strength is less than the predetermined amount.

When ECU 80 determines that the vehicle is not suddenly braked (NO in step S122), ECU 80 disengages K0 clutch 11 (step S123). After this, ECU 80 causes the process to be performed to return to the main process.

When ECU 80 determines that the vehicle is suddenly braked (YES in step S122), ECU 80 disengages K0 clutch 11 and K2 clutch 21 (step S124). After this, ECU 80 causes the process to be performed to return to the main process.

When ECU 80 determines that the road is a bad road (YES in step S121), ECU 80 determines, as in step S122, whether or not the vehicle is suddenly braked (step S125).

When ECU 80 determines that the vehicle is not suddenly braked (NO in step S125), ECU 80 disengages K0 clutch 11 and LUC 32 (step S126). After this, ECU 80 causes the process to be performed to return to the main process.

When ECU 80 determines that the vehicle is suddenly braked (YES in step S125), ECU 80 disengages K0 clutch 11, K2 clutch 21, and LUC 32 (step S127). After this, ECU 80 causes the process to be performed to return to the main process.

As such a process is performed, the relation shown in FIG. 2 is achieved. Namely, even when the accelerator pedal position is 0% and the vehicle speed is V1 (km/h) or more, the normal control for K0 clutch 11, K2 clutch 21, and LUC 32 is performed as long as sub transmission 41 is in the high gear, regardless of the road surface condition and the brake condition.

When the accelerator pedal position is 0%, the vehicle speed is V1 (km/h) or more, and sub transmission 41 is in the low gear, the control is done in the following way. If the road is not a bad road and the vehicle is normally braked, K0 clutch 11 is disengaged. If the road is not a bad road and the vehicle is suddenly braked, K2 clutch 21 is also disengaged in addition to K0 clutch 11.

If the road is a bad road, LUC 32 is additionally disengaged relative to the case where the road is not a bad road. Namely, if the road is a bad road and the vehicle is normally braked, LUC 32 is disengaged in addition to K0 clutch 11. If the road is a bad road and the vehicle is suddenly braked, LUC 32 is also disengaged in addition to K0 clutch 11 and K2 clutch 21.

Thus, the control is done so that disengagement of K2 clutch 21 is avoided to a maximum possible extent, and accordingly a wide range of the regenerative operation by the MG which is an advantage of the hybrid vehicle can be ensured. Moreover, only the control of the clutches can be used to achieve the protection control applied to the case where an excessively large torque is applied to the drive system, and accordingly, the response time can be shortened as compared with the case where the automatic transmission is shifted to a higher gear.

It should be noted that the protection control shown in FIG. 3 is protection control for the drive system when the speed is reduced. Therefore, the protection control is performed when the brake is operated and is not performed when the accelerator pedal position is not zero (when the accelerator pedal is operated). When the vehicle speed is sufficiently low (less than V1 for example), an excessively large torque which may cause a problem is not applied to the drive system even when the vehicle is braked somewhat strongly and thus the protection control is not performed. When sub transmission 41 is in the high gear, a torque which is excessively large like that when sub transmission 41 is in the low gear is not applied to the drive system, and therefore, the protection control is not performed.

SUMMARY OF THE EMBODIMENT

The embodiment described above is summarized in the following.

(1) ECU 80 is a control apparatus for vehicle 1 including a drive system. The drive system includes a drive source (engine 10, MG 20 for example) and a transmission mechanism transmitting a torque between the drive source and a drive wheel (front wheels 51, rear wheels 52, for example). The transmission mechanism includes at least one clutch (K0 clutch 11, K2 clutch 21, LUC 32 for example) configured to be switchable between an engaged state of transmitting the torque between elements constituting the drive system and a disengaged state of failing to transmit the torque.

ECU 80 detects at least one loaded state in which an excessively large torque can be applied to the drive system in the direction from the drive wheel. When ECU 80 detects the at least one loaded state in which an excessively large torque can be applied (YES in step S111 to step S113, step S121, step S122, step S125 in FIG. 3, for example), ECU 80 disengages a predetermined clutch (step S123, step S124, step S126, step S127, for example).

As seen from the above, in the case of the loaded state(s) in which an excessively large torque can be applied to the drive system in the direction from the drive wheel, disengagement of K0 clutch 11 causes no torque to be transmitted to engine 10, disengagement of K2 clutch 21 causes no torque to be transmitted to MG 20, and disengagement of LUC 32 causes no torque to be directly transmitted to engine 10, MG 20, and a shaft connecting them and torque converter 31 (it should be noted that the torque is indirectly transmitted via the fluid of torque converter 31).

Thus, predetermined elements such as engine 10, MG 20, and the shaft connecting them with torque converter 31 are disconnected from the drive system, and therefore, no moment of inertia of the disconnected elements is applied and the torque applied to the drive system can be suppressed. In this case, it is only necessary to switch the clutch(es) to the disengaged state, and the response can therefore be enhanced.

As a result of this, in the case where an excessively large torque can be applied to the drive system in vehicle 1, the torque applied to a predetermined element constituting the drive system can be blocked and the torque applied to the drive system can be suppressed with a good response.

(2) The at least one clutch is a plurality of clutches (K0 clutch 11, K2 clutch 21, LUC 32 for example). The at least one loaded state is a plurality of loaded states (combinations of respective loaded states shown in step S111 to step S113, step S121, step S122, step S125 in FIG. 3, for example). As shown in FIGS. 2 and 3, ECU 80 disengages at least two of a plurality of clutches in a stepwise manner, depending on which of a plurality of loaded states is detected (step S123, step S124, step S126, step S127, for example).

As seen from the above, in the case where an excessively large torque can be applied to the drive system, the torque applied to at least two of a plurality of predetermined elements can be blocked in a stepwise manner depending on which of a plurality of loaded states is detected, and the torque applied to the drive system can be suppressed in a stepwise manner.

As a result of this, less clutches are switched to the disengaged state when the load is lower, and thus the response with which the torque is blocked can be enhanced. In contrast, a higher load causes more clutches to be switched to the disengaged state, and thus more predetermined elements are disconnected from the drive system and the torque applied to the drive system can be suppressed to a greater extent.

(3) The drive source includes engine 10. The transmission mechanism includes torque converter 31 provided on the output side of engine 10, automatic transmission 30 provided on the output side of torque converter 31, and sub transmission 41 provided on the output side of automatic transmission 30 and configured to further decelerate the output from automatic transmission 30. The plurality of clutches include LUC 32 included in torque converter 31, and K0 clutch 11 provided between engine 10 and torque converter 31.

ECU 80 detects, as the at least one loaded state, a state in which vehicle 1 is braked (the state of YES in step S101 for example), a state in which sub transmission 41 decelerates the output from automatic transmission 30 (the state where the transmission is in the low gear, the state of YES in step S113 for example), and a state in which the vehicle is traveling on a bad road (the state of YES in step S121 for example).

ECU 80 disengages K0 clutch 11 (step S123) when the state in which vehicle 1 is braked (the state of YES in step S101 for example), the state in which sub transmission 41 decelerates the output from automatic transmission 30 (the state of YES in step S113 for example), and a state in which the vehicle is not traveling on a bad road (the state of NO in step S121 for example) are detected.

ECU 80 disengages K0 clutch 11 and LUC 32 (step S126) when the state in which vehicle 1 is braked (the state of YES in step S101), the state in which sub transmission 41 decelerates the output from automatic transmission 30 (the state of YES in step S113 for example), and the state in which the vehicle is traveling on a bad road (the state of YES in step S121 for example) are detected.

As seen from the above, when the state in which vehicle 1 is braked, the state in which sub transmission 41 decelerates the output from automatic transmission 30, and the state in which the vehicle is not traveling on a bad road are detected, transmission of the torque to engine 10 can be blocked. When the state in which vehicle 1 is braked, the state in which sub transmission 41 decelerates the output from automatic transmission 30, and the state in which the vehicle is traveling on a bad road are detected, the torque transmitted by LUC 32 can additionally be blocked. Thus, in the case where an excessively large torque can be applied to the drive system, the torque applied to engine 10 or to an element located between engine 10 and LUC 32 can be blocked in a stepwise manner. Since the elements are disconnected in a stepwise manner, the torque applied to the drive system can be suppressed in a stepwise manner.

As a result of this, in the case where only K0 clutch 11 is switched to the disengaged state, the response with which the torque to engine 10 is blocked can be enhanced to a greater extent. Moreover, in the case where LUC 32 is switched to the disengaged state in addition to K0 clutch 11, the torque applied to engine 10 and to an element located between LUC 32 and engine 10 can be suppressed to a greater extent.

(4) The drive source further includes MG 20 provided between engine 10 and torque converter 31. The plurality of clutches further include K2 clutch 21 provided between MG 20 and a shaft connecting engine 10 and torque converter 31 to each other.

ECU 80 detects, as the at least one loaded state, the fact that the strength of braking (increase of the hydraulic pressure indicated by a signal from brake hydraulic pressure sensor 82 for example) is a predetermined amount (P1 for example) or more (step S122, step S125 for example). When ECU 80 detects the state in which the strength of braking is a predetermined amount or more (YES in step S122, step S125 for example), ECU 80 disengages K2 clutch 21 (step S124, step S127 for example) in addition to those disengaged when the strength of braking is less than the predetermined amount (NO in step S122, step S125 for example).

As seen from the above, in the case of the loaded state(s) in which the strength of braking is a predetermined amount or more, transmission of the torque to MG 20 can further be blocked. Thus, in the case where an excessively large torque can be applied to the drive system, the torque applied to MG 20 can be blocked. Accordingly, the torque applied to the drive system can further be suppressed.

MODIFICATIONS

Modifications of the above-described embodiment will now be described.

(1) In the above-described embodiment, the control apparatus is ECU 80 and, in accordance with a computer program (software) for the process shown in FIG. 3 to be performed, ECU 80 performs the process and thereby performs the protection control for the drive system. However, the control apparatus is not limited to this but may be configured by a hardware circuit for performing the protection control for the drive system.

Figure 4:
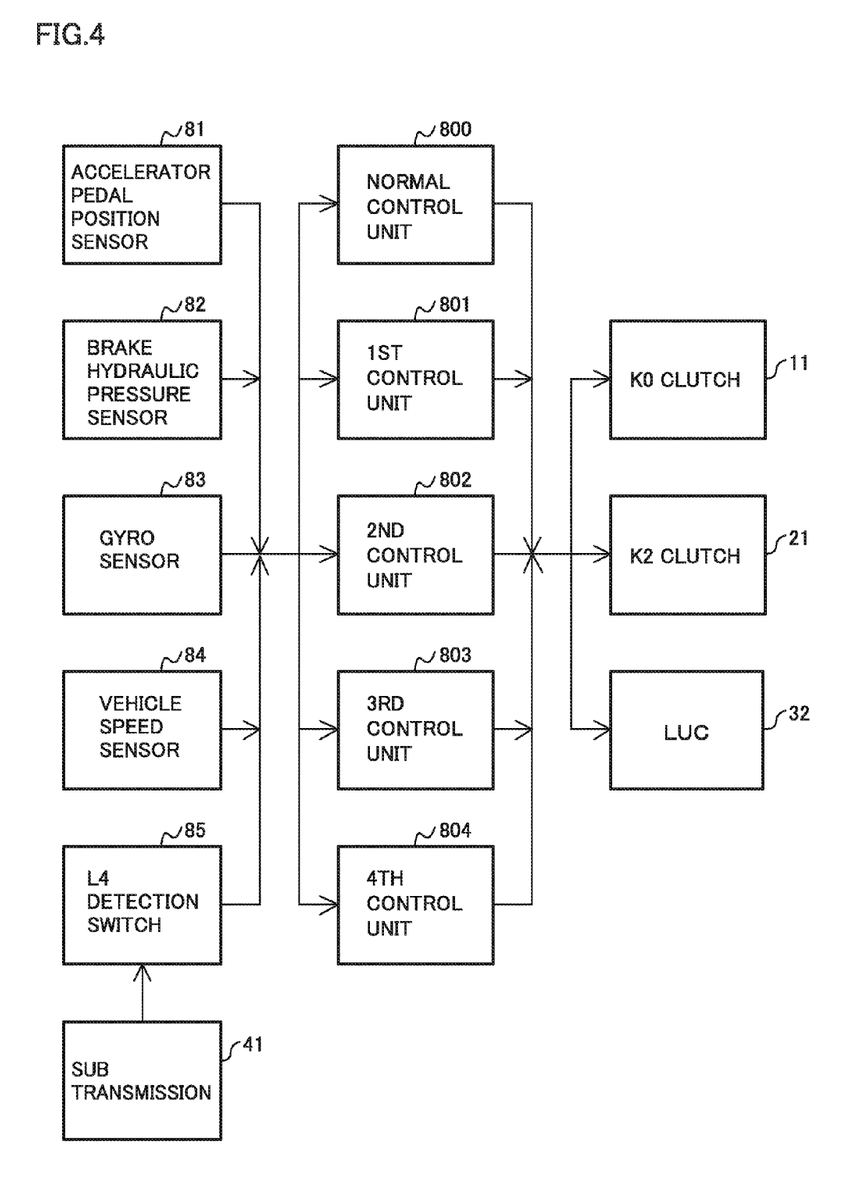
FIG. 4 is a functional block diagram schematically showing a configuration for protecting a drive system in the present embodiment.

FIG. 4 is a functional block diagram schematically showing a configuration for protecting the drive system in the present embodiment. Referring to FIG. 4, as to K0 clutch 11, K2 clutch 21, LUC 32, sub transmission 41, accelerator pedal position sensor 81, brake hydraulic pressure sensor 82, gyro sensor 83, vehicle speed sensor 84, and L4 detection switch 85, the description of them has been given above in connection with FIG. 1 and will therefore not be repeated.

The control apparatus includes a normal control unit 800, a first control unit 801, a second control unit 802, a third control unit 803, and a fourth control unit 804. Normal control unit 800, first control unit 801, second control unit 802, third control unit 803, and fourth control unit 804 are a relay circuit (hardware circuit) controlling engagement and disengagement of K0 clutch 11, K2 clutch 21, and LUC 32, based on signals from accelerator pedal position sensor 81, brake hydraulic pressure sensor 82, gyro sensor 83, vehicle speed sensor 84, and L4 detection switch 85.

First control unit 801 detects, as the at least one loaded state, a state in which the accelerator pedal position indicated by a signal from accelerator pedal position sensor 81 is 0%, a state in which the vehicle speed indicated by a signal from vehicle speed sensor 84 is V1 (km/h) or more, a state in which the gear of sub transmission 41 indicated by a signal from L4 detection switch 84 is the low gear, a state in which an indicator indicating a bad road based on a signal from gyro sensor 83 is less than a predetermined value, and a state in which an increase of the hydraulic pressure based on a signal from brake hydraulic pressure sensor 82 is less than P1 (MPa/sec).

First control unit 801 disengages K0 clutch 11 when it detects the state in which the accelerator pedal position indicated by a signal from accelerator pedal position sensor 81 is 0%, the state in which the vehicle speed indicated by a signal from vehicle speed sensor 84 is V1 (km/h) or more, the state in which the gear of sub transmission 41 indicated by a signal from L4 detection switch 84 is the low gear, the state in which an indicator indicating a bad road based on a signal from gyro sensor 83 is less than a predetermined value, and the state in which an increase of the hydraulic pressure based on a signal from brake hydraulic pressure sensor 82 is less than P1 (MPa/sec).

Second control unit 802 detects, as the at least one loaded state, a state in which the accelerator pedal position indicated by a signal from accelerator pedal position sensor 81 is 0%, a state in which the vehicle speed indicated by a signal from vehicle speed sensor 84 is V1 (km/h) or more, a state in which the gear of sub transmission 41 indicated by a signal from L4 detection switch 84 is the low gear, a state in which an indicator indicating a bad road based on a signal from gyro sensor 83 is a predetermined value or more, and a state in which an increase of the hydraulic pressure based on a signal from brake hydraulic pressure sensor 82 is less than P1 (MPa/sec).

Second control unit 802 disengages K0 clutch 11 and LUC 32 when it detects the state in which the accelerator pedal position indicated by a signal from accelerator pedal position sensor 81 is 0%, the state in which the vehicle speed indicated by a signal from vehicle speed sensor 84 is V1 (km/h) or more, the state in which the gear of sub transmission 41 indicated by a signal from L4 detection switch 84 is the low gear, the state in which an indicator indicating a bad road based on a signal from gyro sensor 83 is a predetermined value or more, and the state in which an increase of the hydraulic pressure based on a signal from brake hydraulic pressure sensor 82 is less than P1 (MPa/sec).

Third control unit 803 detects, as the at least one loaded state, a state in which the accelerator pedal position indicated by a signal from accelerator pedal position sensor 81 is 0%, a state in which the vehicle speed indicated by a signal from vehicle speed sensor 84 is V1 (km/h) or more, a state in which the gear of sub transmission 41 indicated by a signal from L4 detection switch 84 is the low gear, a state in which an indicator indicating a bad road based on a signal from gyro sensor 83 is less than a predetermined value, and a state in which an increase of the hydraulic pressure based on a signal from brake hydraulic pressure sensor 82 is P1 (MPa/sec) or more.

Third control unit 803 disengages K0 clutch 11 and K2 clutch 21 when it detects the state in which the accelerator pedal position indicated by a signal from accelerator pedal position sensor 81 is 0%, the state in which the vehicle speed indicated by a signal from vehicle speed sensor 84 is V1 (km/h) or more, the state in which the gear of sub transmission 41 indicated by a signal from L4 detection switch 84 is the low gear, the state in which an indicator indicating a bad road based on a signal from gyro sensor 83 is less than a predetermined value, and the state in which an increase of the hydraulic pressure based on a signal from brake hydraulic pressure sensor 82 is P1 (MPa/sec) or more. Namely, third control unit 803 further disengages K2 clutch 21 in addition to the one disengaged under the control by first control unit 801.

Fourth control unit 804 detects, as the at least one loaded state, a state in which the accelerator pedal position indicated by a signal from accelerator pedal position sensor 81 is 0%, a state in which the vehicle speed indicated by a signal from vehicle speed sensor 84 is V1 (km/h) or more, a state in which the gear of sub transmission 41 indicated by a signal from L4 detection switch 84 is the low gear, a state in which an indicator indicating a bad road based on a signal from gyro sensor 83 is a predetermined value or more, and a state in which an increase of the hydraulic pressure based on a signal from brake hydraulic pressure sensor 82 is P1 (MPa/sec) or more.

Fourth control unit 804 disengages K0 clutch 11, K2 clutch 21, and LUC 32 when it detects the state in which the accelerator pedal position indicated by a signal from accelerator pedal position sensor 81 is 0%, the state in which the vehicle speed indicated by a signal from vehicle speed sensor 84 is V1 (km/h) or more, the state in which the gear of sub transmission 41 indicated by a signal from L4 detection switch 84 is the low gear, the state in which an indicator indicating a bad road based on a signal from gyro sensor 83 is a predetermined value or more, and the state in which an increase of the hydraulic pressure based on a signal from brake hydraulic pressure sensor 82 is P1 (MPa/sec) or more. Namely, fourth control unit 804 further disengages K2 clutch 21 in addition to those disengaged under the control by second control unit 802.

Normal control unit 800 engages or disengages K0 clutch 11, K2 clutch 21, and LUC 32 under a predetermined condition based on signals from accelerator pedal position sensor 81, brake hydraulic pressure sensor 82, gyro sensor 83, vehicle speed sensor 84, L4 detection switch 85, and other sensors (not shown) in a normal case where the control for protecting the drive system is not performed, namely in the case where at least one clutch among K0 clutch 11, K2 clutch 21, and LUC 32 is not disengaged by first control unit 801, second control unit 802, third control unit 803, and fourth control unit 804.

The control by first control unit 801 corresponds to the control under which ECU 80 performs the operations in steps S101, S111 to S113, and S121 to S123 of FIG. 3. The control by second control unit 802 corresponds to the control under which ECU 80 performs the operations in steps S101, S111 to S113, S121, S125, and S126 in FIG. 3. The control by third control unit 803 corresponds to the control under which ECU 80 performs the operations in steps S101, S111 to S113, S121, S122, and S124 in FIG. 3. The control by fourth control unit 804 corresponds to the control under which ECU 80 performs the operations in steps S101, S111 to S113, S121, S125, and S127 in FIG. 3.

The relay circuit of normal control unit 800, first control unit 801, second control unit 802, third control unit 803, and fourth control unit 804 may be implemented by a programmable logic controller.

(2) The above-described protection control shown in FIGS. 2 and 3 is not limited to the so-called single-MG hybrid system illustrated in connection with the embodiment, but is applicable to other configurations as long as the configuration includes a clutch between elements which are constituent elements of a drive system. For example, the configuration may include two or more MG, rather than one MG. The configuration may also include only the engine as a drive source, rather than the hybrid system. The configuration may include only the motor as a drive source without the engine (fuel cell vehicle, electric vehicle, and the like, for example). The configuration may include a manual transmission rather than automatic transmission 30. The drive system may not be the all-wheel drive such as four-wheel drive, but be other drive systems such as two-wheel drive which is front-wheel drive or rear-wheel drive.

(3) In the above-described embodiment, the loaded states in which an excessively large torque can be applied to the drive system in the direction from the drive wheel refer to the states shown in step S111 to step S113, step S121, step S122, and step S125 in FIG. 3. The loaded states, however, are not limited to them but may be other loaded states. For example, in the case where the road surface has a high coefficient of friction, a large force is applied from the road surface to the wheels. Then, the coefficient of friction of the road surface may be estimated by a method such as detection of the wheel spin of wheels and a state in which the coefficient of friction is a predetermined value or more may be regarded as one of the loaded states. Further, the deceleration in the direction of travel of vehicle 1 may be detected and a state in which the deceleration is a predetermined value or more may be regarded as one of the loaded states.

(4) In the above-described embodiment as shown in FIGS. 2 and 3, in the case where the accelerator pedal position is 0%, the vehicle speed is V1 (km/h) or more, and the sub transmission is in the low gear, K2 clutch 21 is disengaged in addition to K0 clutch 11 if the road surface is a non-wavy road (not a bad road) and the vehicle is braked suddenly, while LUC 32 is disengaged in addition to K0 clutch 11 if the road surface is a wavy road (a bad road) and the vehicle is not suddenly braked.

However, the manner of operation is not limited to the above but may be performed to the contrary. Namely, in the case where the accelerator pedal position is 0%, the vehicle speed is V1 (km/h) or more, and sub transmission is in the low gear, LUC 32 may be disengaged in addition to K0 clutch 11 if the road surface is a non-wavy road (not a bad road) and the vehicle is braked suddenly, while K2 clutch 21 may be disengaged in addition to K0 clutch 11 if the road surface is a wavy road surface (a bad road) and the vehicle is not suddenly braked.

(5) In the above-described embodiment, when the loaded state shown in FIGS. 2 and 3 is detected, each clutch is disengaged. However, the manner of operation is not limited to this. Namely, the clutch may be disengaged when other loaded states are detected, as long as clutches are disengaged in a stepwise manner depending on which of a plurality of loaded states in which an excessively large torque can be applied to the drive system in the direction from the drive wheel is detected. For example, in the case where the number of satisfied loaded states is less than "a" among a plurality of loaded states, none of the clutches may be disengaged. In the case where the number of satisfied loaded states is "a" or more and less than "b", one predetermined clutch may be disengaged. In the case where the number of satisfied loaded states is "b" or more and less than "c", two predetermined clutches may be disengaged. In the case where the number of satisfied loaded states is "c" or more, three predetermined clutches may be disengaged.

(6) The sensor for determining whether the road is a bad road or not as shown in step S121 of FIG. 3 is gyro sensor 83. However, the sensor is not limited to this but may be another sensor as long as the sensor can be used to determine whether the road is a bad road or not. For example, the sensor may be an acceleration sensor or a vibration sensor. Further, the way to determine whether the road is a bad road or not is not limited to the way shown in step S121 in FIG. 3, but may be any way.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control apparatus for a vehicle including a drive system,
   the drive system including a drive source and a transmission mechanism transmitting a torque between the drive source and a drive wheel,
   the transmission mechanism including at least two clutches switching between an engaged state of transmitting the torque between elements constituting the drive system and a disengaged state of failing to transmit the torque,
   the control apparatus comprising:
   a detection unit configured to detect a loaded state in which an excessively large torque can be applied to the drive system in a direction from the drive wheel; and
   a control unit configured to switch at least one of the clutches to the disengaged state when the detection unit detects the loaded state in which an excessively large torque can be applied, wherein
   the drive source includes an engine,
   the transmission mechanism includes a torque converter provided on an output side of the engine, a main transmission provided on an output side of the torque converter, and a sub transmission provided on an output side of the main transmission and configured to further decelerate an output from the main transmission,
   the at least two clutches include a lock-up clutch included in the torque converter, and a first clutch provided between the engine and the torque converter,
   the detection unit detects, as the loaded state, a state in which the vehicle is braked, a state in which the sub transmission decelerates the output from the main transmission, and a state in which the vehicle is traveling on a bad road,
   the control unit switches the first clutch to the disengaged state when the detection unit detects the state in which the vehicle is braked, the state in which the sub transmission decelerates the output from the main transmission, and a state in which the vehicle is not traveling on a bad road, and
   the control unit switches the first clutch and the lock-up clutch to the disengaged state when the detection unit detects the state in which the vehicle is braked, the state in which the sub transmission decelerates the output from the main transmission, and the state in which the vehicle is traveling on the bad road.

2. The control apparatus for a vehicle according to claim 1, wherein
   the drive source further includes a motor generator provided between the engine and the torque converter,
   the at least two clutches further include a second clutch provided between the motor generator and a shaft connecting the engine and the torque converter to each other,
   the detection unit detects, as the loaded state, a state in which a strength of braking is a predetermined amount or more, and
   the control unit additionally switches the second clutch to the disengaged state when the detection unit detects the state in which the strength of braking is a predetermined amount or more.

3. A vehicle comprising the control apparatus as recited in claim 1.

4. A vehicle comprising the control apparatus as recited in claim 2.

* * * * *